Dec. 22, 1970   C. T. ANDERSON   3,548,437
MACHINE FOR WASHING MOTOR CARS
Filed March 10, 1969   2 Sheets-Sheet 1

INVENTOR.
CHARLIE T. ANDERSON
BY E. Donald Hays
ATTORNEY

Dec. 22, 1970   C. T. ANDERSON   3,548,437
MACHINE FOR WASHING MOTOR CARS
Filed March 10, 1969   2 Sheets-Sheet 2

INVENTOR.
CHARLIE T. ANDERSON
BY E. Donald Mayh
ATTORNEY 3,548,437
MACHINE FOR WASHING MOTOR CARS
Charlie T. Anderson, 2516 Woodford,
Shreveport, La. 71108
Filed Mar. 10, 1969, Ser. No. 805,592
Int. Cl. B60s 3/04
U.S. Cl. 15—21                         8 Claims

ABSTRACT OF THE DISCLOSURE

A machine for washing motor cars including a top brush assembly which is made up of a number of interconnected, flexible brushes adapted to cover the top surface of the car. A side brush assembly is pivotably attached to each of the top brush assemblies and is adapted to make firm contact with the side of the automobile. A separate front and rear brush assembly is mounted on each of the ends of the side brush assemblies and is adapted to be pivotably moved to clean the front and rear of the automobile, respectively. A reciprocating mechanism is connected to the suspension means for the brush assemblies and reciprocates all of the brushes over the car to scrub the car clean. Means to supply water to the brushes is provided.

BACKGROUND OF THE INVENTION

Field of the invention

This invention relates to a machine for washing motor cars.

Description of the prior art

The majority of the presently used machines for washing automobiles use high pressure jets of water to effect the cleaning of the automobile. While some automatic car wash installations provide rotating brush assemblies, these are usually limited to contact with the front and rear of the automobile. These machines for washing automobiles sometimes do not effectively remove baked on dirt and road haze. Additionally, the foregoing car wash mechanisms do not remove the chalked paint normally present on automobiles.

Therefore, there is a need for a car wash apparatus which will completely scrub the surface of the automobile while providing a flow of water thereto in order to effectively clean the car.

SUMMARY OF THE INVENTION

It is an object of the present invention to provide a car wash apparatus which completely scrubs the exterior of the automobile.

It is another object of the present invention to provide a car wash mechanism which can conveniently be placed around and removed from a car in a standing position.

It is a further object of the present invention to provide a car wash apparatus which contains a minimum of separate components.

It is still another object of the present invention to provide a car wash apparatus which requires a minimum amount of floor space and accessory equipment to operate.

The foregoing and other objects are realized in a machine for washing a motor car which includes a top brush assembly, including a plurality of flexibly connected brushes, adapted to contact the upper surface of the car. A substantially rigid side brush assembly, generally having the shape of the side of a car, is pivotally attached to each side of the top brush assembly. A front and rear brush pivotably mounted at the respective end of each of the side brush assemblies is provided. Means to reciprocate all of the brushes and the brush assemblies is also provided. Means to supply water to at least some of said brushes is provided.

BRIEF DESCRIPTION OF THE DRAWINGS

One embodiment of the present invention is depicted in the drawings wherein.

DESCRIPTION OF THE PREFERRED EMBODIMENTS

Figures 1, 4:
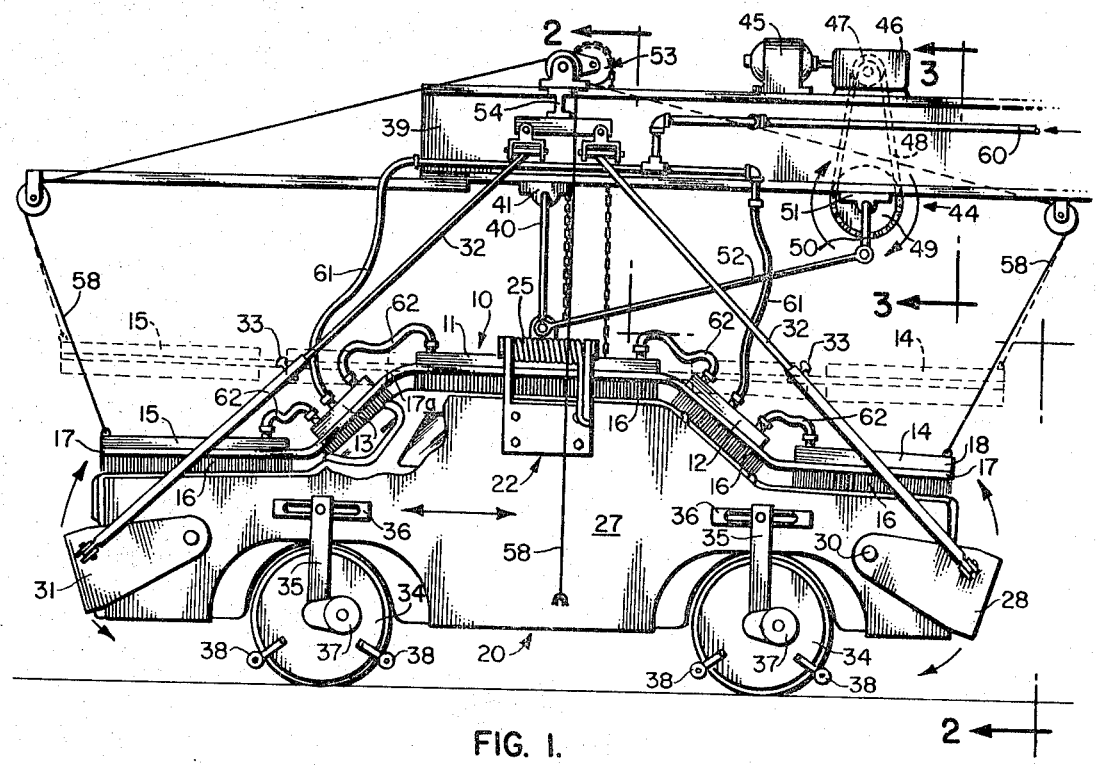
FIG. 1 is a side elevational view of a machine for washing a motor car constructed in accordance with the present invention.
FIG. 4 is an elevational perspective view of some of the brush sections that make up the top brush assembly.
Figure 2:
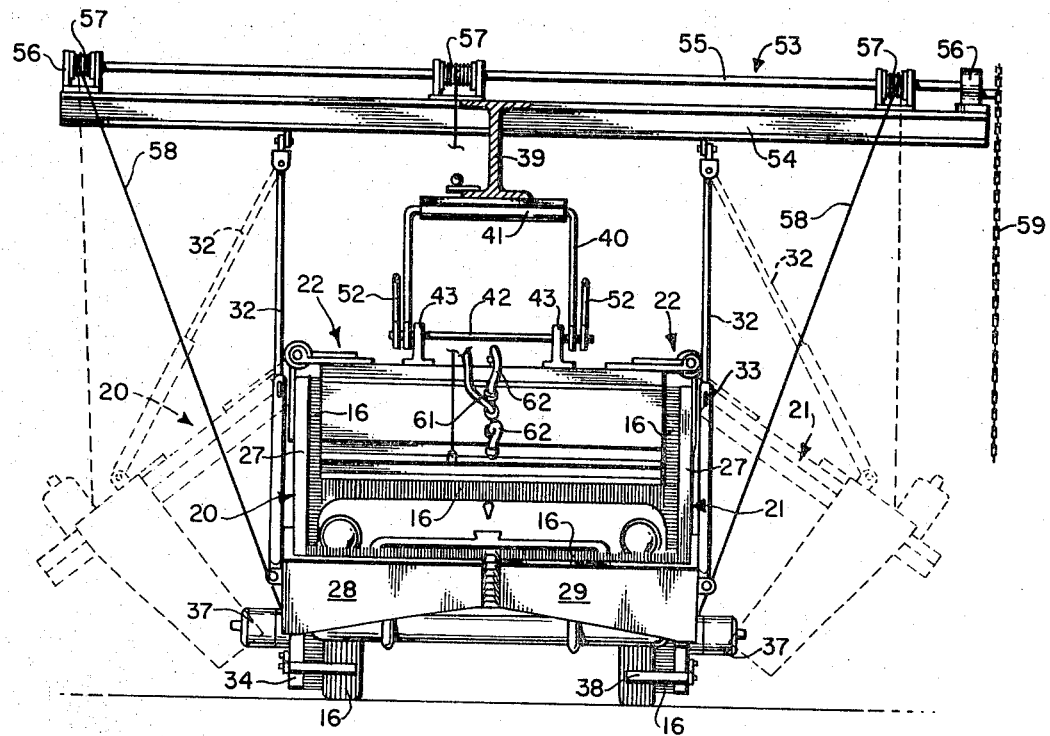
FIG. 2 is a front view of the car wash apparatus depicted in FIG. 1 looking in the direction of the arrows along the line 2—2.

Referring now to FIGS. 1 and 2, it can be seen that the car wash assembly of the present invention includes a top brush assembly, designated generally by the numeral 10. The top brush assembly includes a top brush 11 having a length and width substantially equal to the top surface of an automobile. A rear window brush assembly 12 and a front window brush 13 are provided which are approximately the size of a normal front and rear window respectively of an automobile. A hood brush 14 and a rear trunk brush 15 are also provided in the top brush assembly. Each of the foregoing brush and brush assemblies is provided with long, soft bristles 16 on the underside thereof. The bristles 16 may be carried by a flexible backing 17 which extends throughout the length of all of the foregoing brushes. This flexible backing may be made from carpeting or synthetic, flexible material which is porous and resistant to deterioration by water. A short span of the backing material 17a interconnecting the respective brush assemblies is not provided with bristles in order that the brushes may flex and assume the contour of the automobile. Each of the brushes is provided with a semirigid, flexible support housing 18 which is preferably made from an open-pore, semirigid, cellular material such as foamed polyethylene, foamed polystyrene, foamed polyurethane or other synthetic material and has imbeded therein, as seen in FIG. 4, a plurality of flexible water distribution pipes 19 provided with a plurality of openings 19a to permit an even distribution of water throughout the open, cellular support housing mass 18. The porous, flexible backing 17 will distribute the water evenly throughout the area of the bristles as shown in FIG. 4. The flexible backing 17, in conjunction and cooperation with the semirigid support housing 18, provides sufficient rigidity to the upper brush assemblies to permit them to be self-supporting when raised to the upper position, as shown in dotted outline in FIG. 1. However, the entire brush assemblies should be of sufficient flexibility and conformability to automatically assume the contour and shape of the rounded rear and front windshields, hood, trunk and top of an ordinary automobile.

Figure 5:
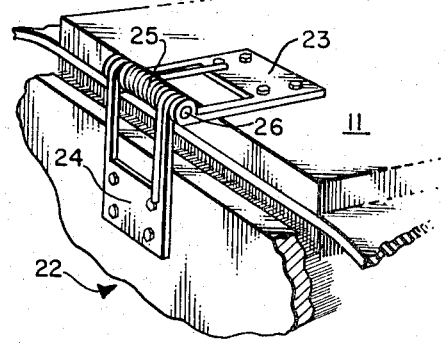
FIG. 5 is an enlarged perspective elevational broken section of one of the side and top brushes showing the hinge mechanism for attaching these brush assemblies together.

A left-hand side brush assembly 20 and a right-hand side brush assembly 21 are attached to the top brush assembly by means of a hinge assembly, designated generally as 22, as can be seen more clearly in FIG. 5. The hinge assembly includes an upper strap 23 attached to the top brush 11 and a lower strap 24 attached to the respective side brush assembly. A helical spring 25 is provided under coiling tension around a hinge pin 26 which connects the two hinge straps together. The spring 25 is sufficiently sized and positioned in a manner to exert pressure down on the respective side brush assemblies in order to press these assemblies against the sides of the automobile. Each of the side brush assemblies include a semiflexible outer surface support material 27 having affixed to its interior surface a covering of bristles 16. A plurality of flexible water distribution pipes (not shown) are provided in the support material 27 of the side brushes and distributes water to the bristles 16 in a manner similar to that described hereinbefore.

As seen in FIGS. 1 and 2, a left-hand front brush assembly 28 and a right-hand front brush assembly 29 is pivotably mounted on the respective side brush assemblies by means of a pivot pin 30. A similar set of brushes 31 (only one of which is shown) is provided at the rear of the side brush assemblies 20 and 21. Both of the front brush assemblies and the rear brush assemblies are provided with reciprocating drive arms 32. The lower portion of the reciprocating drive arm 32 is a hollow tube and the upper portion is a smaller tube or rod which is slidably positioned to telescope inside the lower portion of the arm. A locking pin 33 holds the reciprocating arm 32 in an extended position when the side brushes 27—27 are held against the car. In order to place a car inside of the brush assemblies, the side brushes are raised to the position shown in dotted outline in FIG. 2, and the hood brush 14 and the trunk brush 15 are raised to the position shown in FIG. 1.

Wheel brush assembly 34 is suspended by an arm 35 from the side brush 27 which provides an elongated slot 36 to receive the pin provided on the support arm. A drive motor 37 is attached to the support arm 35 and rotates the brush carried on the inner surface of the wheel brush assembly 34. A similar wheel brush assembly is provided for all four wheels of the automobile. A pair of arms 38—38 are attached to each wheel brush assembly 34 and project around the lower portion of the tires of the automobile, as can be seen in FIG. 2. These arms provide stability for the wheel brush assemblies as the top and side brushes are oscillated as will be described hereinafter. Each side brush assembly provides a semicircular cutout adjacent each wheel brush assembly to permit the wheel brush assembly to remain fixed over the wheels and allow the other brushes and brush assemblies to be oscillated.

All of the brush assemblies are supported from an overhead beam 39 by means of a U-shaped hanger 40 received in a bushing 41 attached by welding or other means to the bottom of the beam. The lower end of the U-shaped hanger is provided with an opening therethrough which receives a support rod 42 rotatably mounted in a pair of bearing blocks 43—43 that are fixedly attached to the top brush 11 and thereby support all of the brush assemblies.

Figure 3:
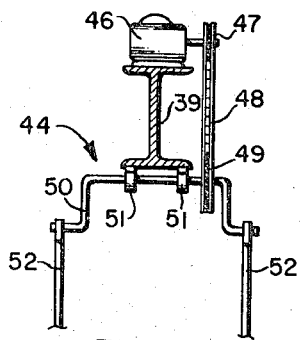
FIG. 3 is a sectional view of the suspension and drive mechanism for the car wash assembly shown in FIG. 1 taken along the line 3—3.

As can be seen in FIGS. 1 and 3, the car wash brush assemblies are reciprocated by a reciprocating mechanism, designated generally 44. The assembly includes an electric drive motor 45 connected to a gear reducer assembly 46, both of which are mounted on top of beam 39. Pulley 47 on the gear box drives chain 48 which is attached at its lower end to a sprocket 49. The sprocket is fixedly attached to U-shaped drive arm 50 that is rotatably mounted in bearing blocks 51—51 attached to the underside of beam 39. Each end of U-shaped drive arm 50 has attached thereto a pair of drive rods 52—52 which are attached at their lower ends to suport rod 42. Thus, when the motor drives through the gear box and gear train the sprocket 49 rotates the arm 51 thereby reciprocating rods 52—52 to reciprocate the entire brush assemblies to provide a scrubbing action of the bristles over the top and side surfaces of the automobile.

As seen in FIGS. 1 and 2, a chain hoist assembly, designated generally 53, is provided to raise and lower the brush assemblies to allow the car to enter and leave the car wash apparatus. The chain hoist assembly includes a transverse support beam 54 extending to each side of the main overhead support beam 39. A shaft 55 extends the length of the support beam and is rotatably mounted in bearing blocks 56 and has positioned at the center and near each end thereof reels 57 for reeling cables 58 which are attached to both side brush assemblies 20 and 21, to the hood brush assembly 14, and the trunk brush assembly 15. As the shaft 55 is rotated by hand through a chain 59, the cables 58 may be wound up or let out to either lift the brush assemblies off the car or to place the brush assemblies on the car after it is driven underneath the apparatus.

In operation the car wash assembly is in the position shown in dotted outline in FIGS. 1 and 2 whereby the automobile may be driven underneath the apparatus and stopped. The brush assemblies are lowered down onto the automobile by means of the chain hoist assembly 53 and then water is supplied to the pipes 19 through supply pipe 60 which is connected by means of flexible hoses 61—61 into the rear window and from window brush assemblies 12 and 13 and supply water to these assemblies as shown more clearly in FIG. 4. Water is supplied to the top brush assembly and to the hood and trunk brush assemblies by means of interconnecting, flexible hoses 62 leading from the front window and rear window brush assemblies.

Initially soapy water is supplied through the supply pipe 60 in order to wet all the surfaces of the car before the car wash apparatus is set in motion. Once all of the brushes are wet down with soapy water, an electrical switch is turned actuating motor 41 setting in motion the reciprocating mechanism for moving all of the brushes back and forth gently over the surfaces of the automobile. As pointed out hereinbefore, as the side brushes move back and forth, the rear brush assemblies 31 and forward brush assemblies 28 are made to reciprocate in an up and down motion to wash the front of the car and the rear of the car since they are rigidly attached through support arm 32 and pivotably attached to the side brush assemblies 27 which results in an up and down motion as the side brushes are reciprocated. If desired, supply pipes similar to those shown in FIG. 4 may be incorporated in the rear brush assemblies 31 and the front brush assemblies 28 and 29. After the car brush assemblies have oscillated for a sufficient length of time to remove the heavy dirt from the car, clear, fresh water is turned into the supply line 60 and the soap is rinsed out of the brushes and the car surface is washed with the rinse water. The brush assemblies are then lifted away from the surfaces of the car by raising the brushes using the chain hoist assembly 53.

While there has been described what is the preferred embodiment of the present invention, it is understood that those skilled in the art can make many modifications thereto without departing from the essence of the invention.

What is claimed is:

1. In a machine for washing a motor car, the combination comprising:
   (a) a top brush assembly, including a plurality of flexibly connected brushes, adapted to contact the upper surfaces of said car;
   (b) a substantially rigid side brush assembly generally having the shape of the side of a car pivotably attached to each side of said top brush assembly;
   (c) a front and a rear brush pivotably mounted at the respective end of each of said side brush assemblies;
   (d) means to reciprocate all of said brushes and brush assemblies; and
   (e) means to supply water to at least some of said brushes.

2. The machine of claim 1 wherein all of said brushes are pivotably suspended from a support means positioned above said car.

3. The machine of claim 1 wherein means are provided for moving said side brush assemblies, and said connected front and back brushes, up and out from the side of said car.

4. The machine of claim 1 wherein spring means are provided to hold said side brush assemblies firmly against the side of said car.

5. The machine of claim 1 wherein individual wheel brush assemblies are pivotably attached to each of said side brush assemblies.

6. The machine of claim 2 wherein each of said front and rear brushes is pivotably connected to said support means by an adjustable length connector.

7. The machine of claim 1 wherein means are provided for elevating at least the front and rear brush sections of said top brush assembly.

8. The machine of claim 2 wherein said support means carries the actuating mechanism for reciprocating said brushes and brush assemblies.

References Cited

UNITED STATES PATENTS

| | | | |
|---|---|---|---|
| 2,800,671 | 7/1957 | Nowak | 15—21 |
| 2,803,025 | 8/1957 | Morison | 15—21 |

EDWARD L. ROBERTS, Primary Examiner